United States Patent [19]

Burr

[11] Patent Number: 4,919,523

[45] Date of Patent: Apr. 24, 1990

[54] TELESCOPE MOTORIZED DRIVE ATTACHMENT

[76] Inventor: James D. Burr, 1960 Jefferson Co. Rd. 23, Evergreen, Colo. 80439

[21] Appl. No.: 339,083

[22] Filed: Apr. 17, 1989

[51] Int. Cl.⁵ .................... G02B 23/16; G02B 7/00; H02R 5/02
[52] U.S. Cl. ..................................... 350/567; 310/91; 310/80
[58] Field of Search ............... 350/567, 568, 537; 248/270.2, 674; 310/91, 79, 80

[56] References Cited

U.S. PATENT DOCUMENTS

| | | | |
|---|---|---|---|
| 3,536,280 | 10/1970 | Barlow | 310/91 |
| 4,097,012 | 6/1978 | McIntyre | 248/674 |
| 4,709,178 | 11/1987 | Burr | 350/568 |

Primary Examiner—Jon W. Henry
Attorney, Agent, or Firm—Kolisch, Hartwell & Dickinson

[57] ABSTRACT

A motorized drive attachment for mounting on a telescope frame, actuatable, for instance, to rotate a declination shaft in the telescope. The attachment includes a pair of concentric, detachable sleeves, providing for the detachable mounting of the housing of a motor in the attachment.

5 Claims, 2 Drawing Sheets

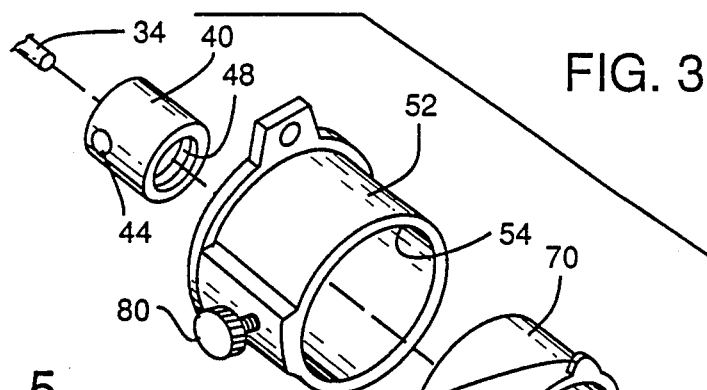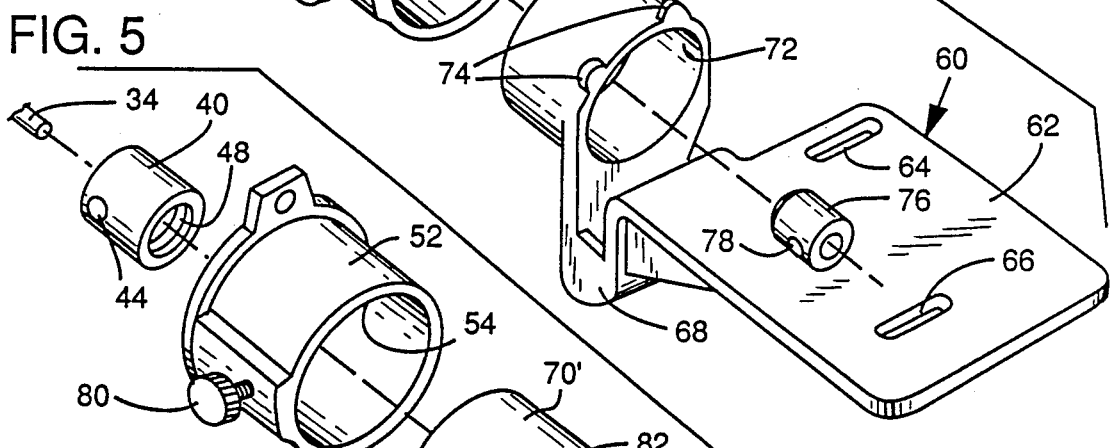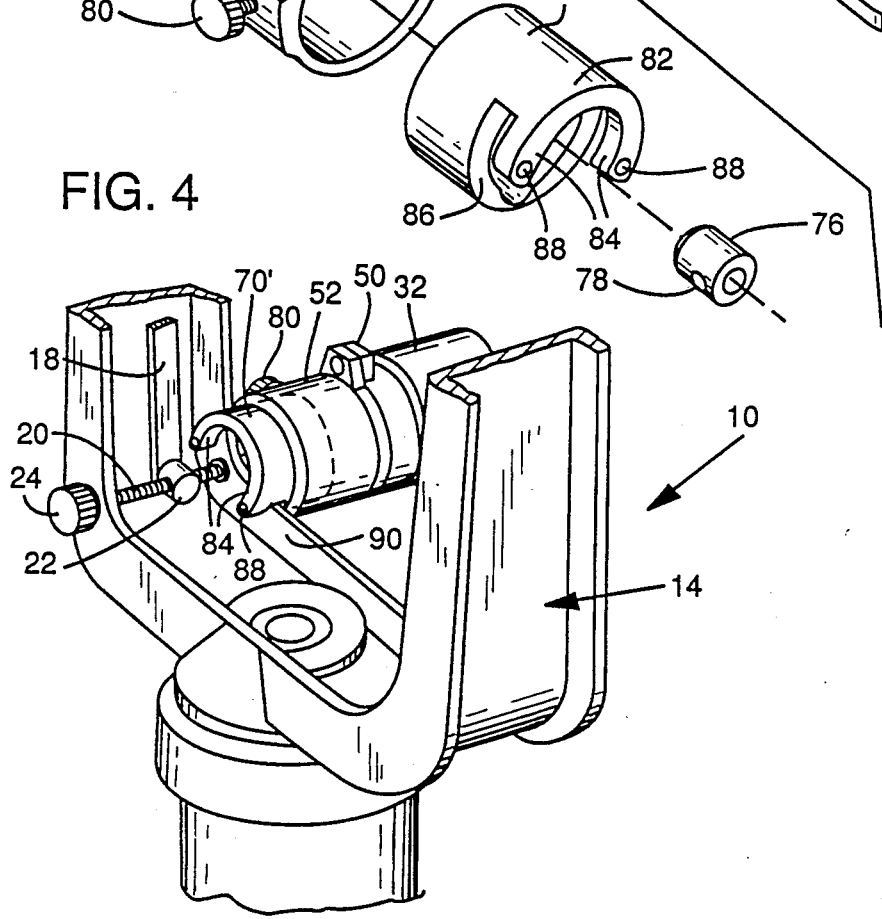

TELESCOPE MOTORIZED DRIVE ATTACHMENT

BACKGROUND AND SUMMARY OF THE INVENTION

This invention relates to a motor control system for a telescope, usable, for instance, in controlling the position of the viewing assembly or telescope tube in the telescope. As herein disclosed, the control system is employed in making adjustments in the declination of the viewing assembly. In disclosing the invention in this context, however, it is not intended to preclude application of the invention in the making of other adjustments where smooth, vibration-free operation is desired.

A common form of mounting for an astronomical telescope embodies a two axis system, comprising an inclined rotation axis, which parallels the earth's rotation axis, and a second horizontal rotation axis, which intersects the inclined axis at right angles to a vertical plane containing the latter axis. The inclined axis is referred to as the polar axis, and the horizontal axis is referred to as the declination axis. Rotation of the telescope tube or viewing assembly about the declination axis adjusts the elevation of the telescope tube to correspond to the latitude at which the telescope is used.

Adjustments in declination are generally accomplished utilizing a knob attached to a lead screw, which operates a tangent arm incorporated in the telescope that is connected to the viewing assembly or telescope tube. These adjustments may be done manually. But, an electric motor facilitates the adjustment, and this is especially true when the telescope is used with video cameras and the like where smooth, vibration-free operation is imperative. Whenever a telescope is used with a time exposure camera, it is absolutely necessary to have a motor operate the lead screw, since a slight touch of the hand to the telescope produces movement impairing the picture due to the high magnification involved.

In my prior issued U.S. Pat. No. 4,709,178, there is disclosed a motorized drive attachment for installation with a telescope, particularly adaptable to make adjustments in the declination of the telescope tube in the telescope, and which features a flexible and resilient clamp that snap fits over a frame portion in the telescope. The clamp mounts the housing of a motor and the output shaft of the motor connects through a coupler with a rod which produces declination adjustment. The drive attachment described provides a relatively simple way for incorporating a motor control system into a telescope for making adjustments therein. However, in some types of telescopes the geometry of the frame in the telescope is such that the clamp structure described will not always provide a satisfactory mounting for the motor. Other motor systems that have been proposed have included exposed gearing or drive belts, with the belts involved being prone to wear and tending to fall off during use and the gears tending to bind or grind with operation of the motor. Furthermore, with a system which involves a motor attached in a substantially permanent manner to the telescope frame and driving a control rod through gears or belts, the position of the motor is such that the telescope, without removal of the motor, is prevented from fitting with the carrying case intended for moving the telescope from one place to another. This obviously is inconvenient, as it means either that the case can't be used, or if the case is used, that the motor and its mounting be removed with unscrewing of screws and disconnecting of belts before the telescope is fittable into the case.

A general object of this invention is to provide improvements in a motorized drive attachment for a telescope featuring a slip-on type of mounting for the housing of the motor, the mounting accurately positioning the motor with the parts mounted in place, but permitting the motor and its housing readily to be disconnected and removed in the event, for instance, it is desired to move the telescope using its telescope case. A relatively small mounting bracket may be secured, as by screws, etc., to the frame of the telescope, and in the usual instance this need not be removed from the telescope in the event that it is desired to move the telescope from one place to another.

Another object is to provide a motorized drive attachment as above described and with a slip-on type of mounting for the housing of a motor in the attachment, where the mounting includes concentric sleeves establishing a mounted position for the motor and its housing in the attachment. One sleeve is secured to the housing of the motor and the other sleeve is mounted in an appropriate manner on the frame of the telescope. With the sleeves arranged so that one is supported on the other, the motor shaft of the motor becomes axially aligned with and coupled to the control shaft of the telescope. With the sleeves separated one from another by relative axial displacement, the motor, its housing and sleeve becomes a separate assembly, leaving essentially only the other sleeve as a residual on the telescope. This portion takes little space and in most instances will not interfere with the packaging of the telescope for movement from one place to another. The attachment contemplated is readily installed on a telescope, with accurate positioning of the drive shaft of the motor and the control shaft of the telescope.

BRIEF DESCRIPTION OF THE DRAWINGS

These and other objects and advantages are attained by the invention, which is described hereinbelow in conjunction with the accompanying drawings, wherein:

FIG. 3 is an exploded view showing the motorized drive attachment;

FIG. 4 is a perspective view of portions of a telescope with a modified form of drive attachment; and FIG. 5 is an exploded view showing the attachment illustrated in FIG. 4.

DETAILED DESCRIPTION OF A PREFERRED EMBODIMENT

Figure 1:
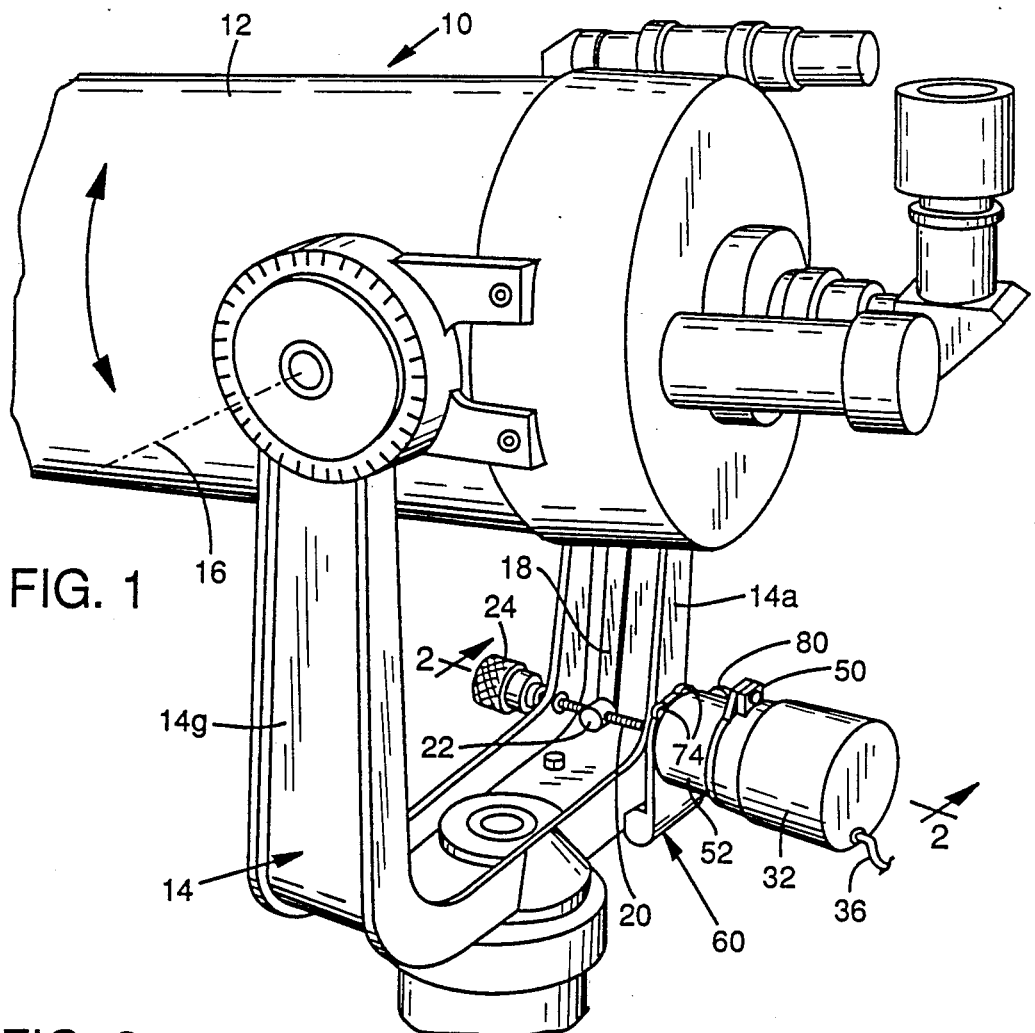
FIG. 1 is a perspective view showing portions of a telescope and further showing a motorized drive attachment as contemplated mounted on the telescope.

In the drawings, the telescope is indicated generally at 10. The telescope includes a viewing assembly or telescope tube 12, and such is disposed between the upstanding legs 14a, 14b of a telescope frame 14. The tube or viewing assembly is relatively rotatably mounted adjacent the tops of legs 14a, 14b for movement about a horizontal declination axis, shown generally at 16. Movement of the viewing assembly about this axis adjusts the elevation of the tube to correspond to the latitude at which the telescope is used.

As typifies most telescopes, the viewing assembly is rotated about declination axis 16 through movement of what is referred to as a tangent arm 18. The tangent arm adjacent its upper extremity is connected to the viewing assembly and with movement of the bottom end of the arm, either to the right or to the left as viewed in FIG. 1, swinging of the telescope tube about declination axis 16 is produced. Adjustment in this tangent arm is produced through the rotation of a rotatably mounted control shaft, also referred to herein as a declination shaft, shown at 20. The shaft is suitably rotatably mounted adjacent its ends in frame 14 of the telescope. The shaft is threaded where such extends between its ends, and threaded follower 22 screwed onto this threaded portion is mounted on the lower extremity of the tangent arm 18. The usual telescope is provided with adjustment knobs, such as knob 24, mounted on each end of the declination shaft. The user through rotation of the knob produces rotation of the declination shaft and this in turn causes swinging of the tangent arm.

Figure 2:
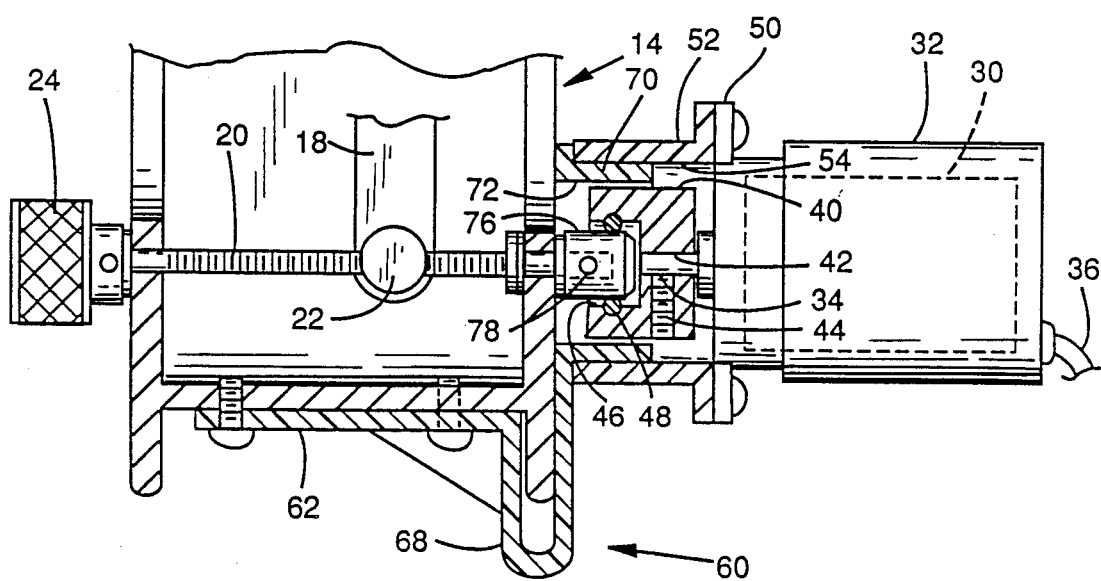
FIG. 2 is an enlarged, cross-sectional view, taken generally along the line 2—2 in FIG. 1.

A motorized drive attachment adapted for installation on the telescope and operable on actuation to rotate declination shaft 20, constructed pursuant to a preferred embodiment of the invention, is illustrated in FIGS. 1 through 3.

Referring to these figures, an electric motor, such as the DC motor shown schematically at 30, is mounted within a motor housing 32. The motor when energized rotates a drive shaft 34 which projects outwardly from one end of the motor housing. The usual cord 36 inclosing conductors, not shown, supplies current to motor 30.

Shaft 34 has a coupler 40 mounted on its end. The coupler includes a counterbore 42 which receives the end of shaft 34 and the coupler is secured to the shaft utilizing set screw 44.

The coupler further includes a cylindrical socket opening 46 concentric with counterbore 42 which faces outwardly on the coupler. Within this socket opening is an annular groove receiving an elastomer O-ring, shown at 48. The inner circumferential margin of the O-ring has a diameter which is somewhat less than the diameter of the socket opening.

Secured to the housing of the motor through ears 50 of the housing is a sleeve or mounting element 52. The sleeve has an axially extending hollow center or interior 54. The sleeve is concentric with the motor drive shaft and provides a protective enclosure for the drive shaft, as well as the coupler mounted on the end of the drive shaft.

A bracket is shown at 60 which includes a plate portion 62 with slots 64, 66, and a U-shaped portion 68 integral with an end of this plate portion. A mounting element or sleeve 70 is joined to an end of U-shaped portion 68. This sleeve has an axially extending hollow center or interior 72. Defining an end limit position on the sleeve are abutment lugs 74.

To adapt a telescope for mounting of the attachment described, one of the knobs 24 on the declination shaft is removed and such is replaced with stub cylinder 76. Such includes a counterbore which receives the end of the declination shaft and the stub cylinder is secured to the declination shaft with a set screw 78. The outer diameter of the stub cylinder is less than the inner diameter of socket opening 46, but slightly greater than the inner diameter of O-ring 48. As a result, the coupler may be slid to have its socket opening move over the exterior of the stub cylinder with a driving connection established between the coupler and the stub cylinder through the O-ring.

In installing the motorized drive attachment, bracket 60 is secured to the telescope frame, as by securing its plate portion 62 through screws to an underside of frame 14. The bracket is positioned so that sleeve 70 has a concentric location with respect to the declination shaft. With the bracket so positioned and with the stub cylinder 76 mounted on the declination shaft to replace the knob thereon, sleeve 52 may be assembled with sleeve 70 by sliding sleeve 52 over the outside of sleeve 70. Sleeve 70 or the inner sleeve then becomes snugly disposed within sleeve 52 or the outer sleeve. The two sleeves may be relatively axially shifted, and also relatively rotated, with the sleeves defining a relative path of movement which in an axial direction coincides with the axis of motor drive shaft 34. As a consequence, with movement of the outer sleeve onto the inner sleeve, and on the sleeves being advanced toward each other, coupler 40 moves onto the stub cylinder to establish a driving connection between the drive shaft and the control shaft.

With the motor housing mounted in place through the sleeves described, and with the proper driving connection established between the shafts, an adjustment screw with knurled knob 80 mounted in an accommodating threaded bore provided in sleeve 52 may be turned to have its inner end come up against sleeve 70 to anchor the two sleeves in a given position.

With the drive attachment mounted on the telescope, sleeves 52, 70 provide a protective enclosure for the coupler and the shafts that the coupler connects. The cooperating sleeves provide for adjustment in the relative position of the two sleeves. With relative rotation of the outer sleeve on the inner sleeve on the inner sleeve, the outer sleeve is positioned to make adjustment screw 80 readily accessible.

To remove the motor, it is an easy manner to loosen screw 80. This frees sleeve 52 to slide off of sleeve 70. This prepares the telescope for packing, with the only residual of the attachment remaining on the telescope frame being the relatively short sleeve 70 and its plate mounting on the underside of the frame. To remount the motor, it is relatively easy to line up the two sleeves and move them against each other with reestablishment of a driving connection, through the coupler, between the drive shaft and the declination control shaft.

A modified form of the invention is illustrated in FIGS. 4 and 5. In this modification of the invention, sleeve 70' corresponding to sleeve 70 in the first embodiment of the invention is joined to a skirt portion 82 with a pair of laterally spaced arms 84. These arms, in turn, are spaced rearwardly from a rear edge 86 of sleeve 70'. Ends of the arms mount set screws 88.

In this form of the invention, the bracket which is mounted on the telescope frame comprises sleeve 70' and its associated arms. The bracket is mounted in place by movement of an end of the declination shaft into the interior of sleeve 70' and with initial positioning of edge 86 of the sleeve on one side of flange 90 of the frame of the telescope and arms 84 on the other side of this flange. With subsequent lateral shifting, the sleeve may be adjusted to make such concentric with the declination shaft. With such so positioned, set screws 88 are tightened to secure the bracket in place. When secured in this manner, sleeve 70' can slidably and detachably receive sleeve 52 in the same manner as sleeve 70 earlier described.

While certain modifications of the invention have been described herein, it should be possible that other variations and modifications are possible without departing from the invention.

It is claimed and desired to secure by Letters Patent:

1. A motorized drive attachment for installation with the rotatable control shaft of a telescope, the shaft protruding from a frame portion of the telescope and the attachment comprising:

a motor and a motor housing enclosing the motor, the motor including a drive shaft projecting from the housing, a bracket and means for securing the bracket to the frame portion of the telescope, a pair of mounting elements with axially extending hollow centers, one being slidably and removably mounted on the other for relative movement in a path extending axially of the elements, one mounting element being secured to the motor housing with said drive shaft extending through its hollow center and the other mounting element being secured to said bracket with the control shaft extending through its hollow center, and a coupler mountable on one of the shafts for engagement with the other of the shafts for rotatably coupling the two shafts.

2. The drive attachment of claim 1, which further includes an adjustable anchor member mounted on one of said elements and engageable with the other of said elements and adjustable to secure the elements from relative movement.

3. The drive attachment of claim 1, wherein said elements are concentric sleeves with one slidably and relatively rotatably mounted on the other.

4. The drive attachment of claim 1, wherein said mounting elements are an inner sleeve and an outer sleeve, the sleeves being concentric and the outer sleeve being relatively rotatable on and slidably relative to the inner sleeve, and which further comprises an adjustable anchor screw mounted on said outer sleeve and adjustable to advance toward the inner sleeve thus to lock the two elements from relative movement.

5. In combination with a telescope including a viewing assembly and a fork frame with upstanding legs mounting the viewing assembly and a fork frame with upstanding legs mounting the viewing assembly, the telescope further including a tangent arm extending along one of the legs of the fork frame adjustable to adjust the declination of the telescope and further having a rotatable control shaft projecting outwardly from at least one leg of said fork frame operatively connected to the tangent arm to swing the tangent arm with rotation of the shaft, a drive attachment controllable to rotate said control shaft under power, said drive attachment including a motor and a motor housing enclosing the motor, the motor including a motor drive shaft projecting from the motor housing, a sleeve element secured to said motor housing concentric with the motor drive shaft and surrounding the drive shaft, a bracket secured to the fork frame including another sleeve element disposed concentric with said control shaft, said other sleeve element fitting within said one sleeve element with the one sleeve element being axially shiftable along and relatively rotatable with respect to the other sleeve element, a releasable coupler establishing a drive connection between the motor drive shaft and control shaft, the coupler being secured to one of the shafts and being engageable with the other shaft through movement of the sleeve elements relatively in an axial direction, and an anchor screw adjustably mounted on said one sleeve element with an inner end engageable with the other sleeve element and with such engagement inhibiting relative movement of said one sleeve element with respect to the other sleeve element.

* * * * *